(12) United States Patent
Lecomte et al.

(10) Patent No.: US 7,957,530 B2
(45) Date of Patent: Jun. 7, 2011

(54) METHOD AND SYSTEM FOR ENSURING SECURE SCRAMBLING AND DE-SCRAMBLING AND THE DISTRIBUTION OF VECTORAL VISUAL SEQUENCES

(75) Inventors: Daniel Lecomte, Paris (FR); Pierre Sarda, Asniéres-sur-Seine (FR)

(73) Assignee: Querell Data Limited Liability Company, Dover, DE (US)

( * ) Notice: Subject to any disclaimer, the term of this patent is extended or adjusted under 35 U.S.C. 154(b) by 1315 days.

(21) Appl. No.: 11/264,306

(22) Filed: Nov. 1, 2005

(65) Prior Publication Data

US 2006/0066625 A1    Mar. 30, 2006

Related U.S. Application Data

(63) Continuation of application No. PCT/FR2004/050179, filed on Apr. 30, 2004.

(30) Foreign Application Priority Data

May 2, 2003 (FR) ...................................... 03 50140

(51) Int. Cl.
*H04N 7/167* (2011.01)
(52) U.S. Cl. ........................................ 380/214; 380/204
(58) Field of Classification Search .................. 380/214, 380/217, 223, 201, 203, 204; 345/547
See application file for complete search history.

(56) References Cited

U.S. PATENT DOCUMENTS

| 5,953,506 | A | * | 9/1999 | Kalra et al. | 709/231 |
| 6,233,356 | B1 | | 5/2001 | Haskell et al. | |
| 6,445,740 | B1 | * | 9/2002 | Mallart et al. | 375/240.08 |
| 7,319,756 | B2 | * | 1/2008 | Oomen et al. | 380/236 |
| 7,382,969 | B2 | * | 6/2008 | Dawson | 386/94 |
| 2001/0053222 | A1 | | 12/2001 | Wakao et al. | |

FOREIGN PATENT DOCUMENTS

| EP | 0 920 209 A1 | 6/1999 |
| WO | WO 98/42098 A1 | 9/1998 |
| WO | WO 0197520 A2 * | 12/2001 |

* cited by examiner

*Primary Examiner* — Beemnet W Dada
(74) *Attorney, Agent, or Firm* — Connolly Bove Lodge & Hutz LLP

(57) ABSTRACT

A process for secured distribution of vector visual sequences in at least two dimensions, animated and including a succession of frames containing at least one multidimensional geometric object to be displayed on a screen of a user and determined by at least one parameter including: analyzing the stream prior to transmission to addressee equipment to generate a modified main stream by deletion and replacement of information coding the original visual signal, having a format the same as the format of the original stream, but of which at least one frame was modified, and complementary information of any format including digital information suitable for permitting reconstruction of the modified frames, which modified main stream and which complementary information are transmitted separately to the addressee equipment.

19 Claims, 1 Drawing Sheet

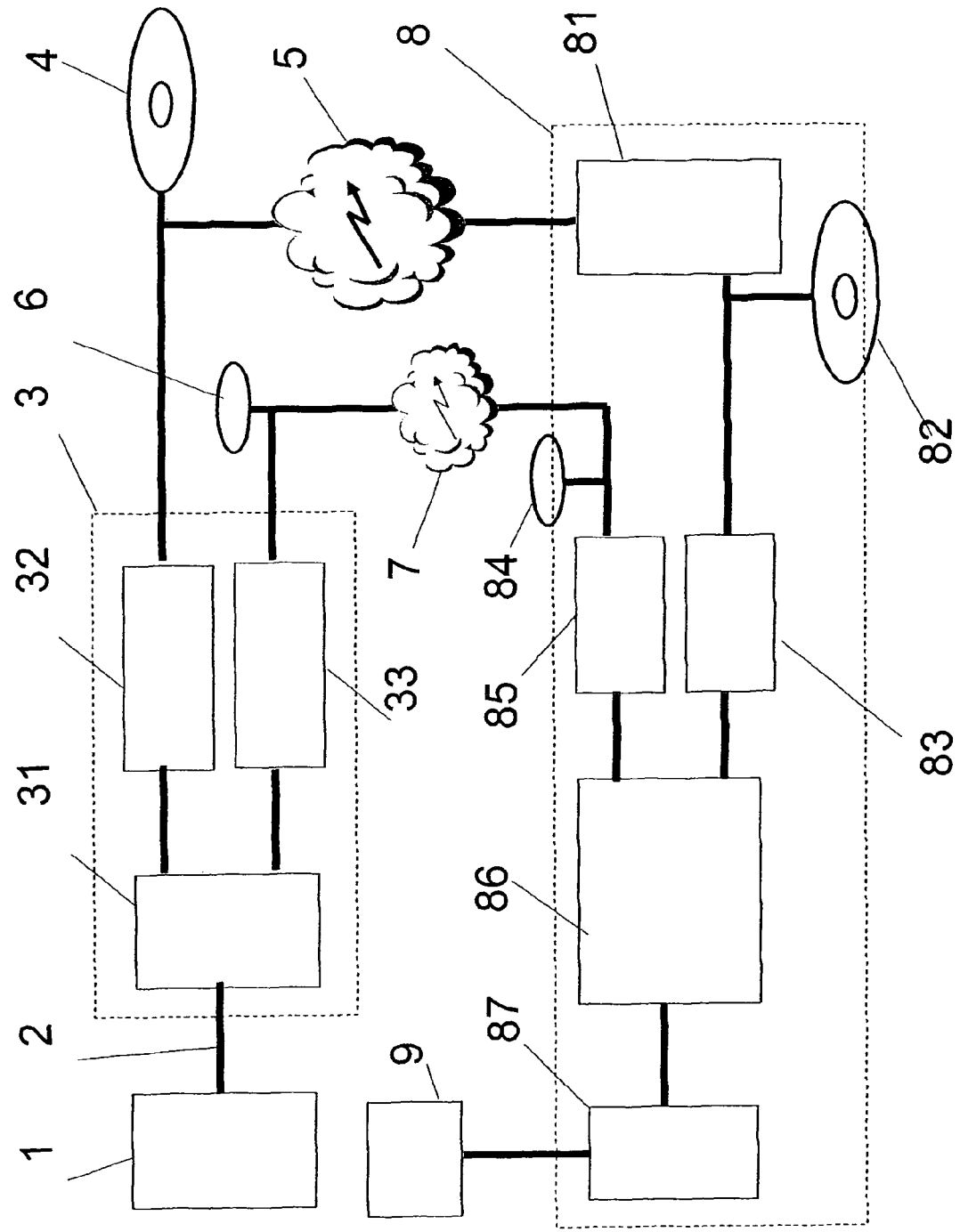

METHOD AND SYSTEM FOR ENSURING SECURE SCRAMBLING AND DE-SCRAMBLING AND THE DISTRIBUTION OF VECTORAL VISUAL SEQUENCES

RELATED APPLICATION

This is a continuation of International Application No. PCT/FR2004/050179, with an international filing date of Apr. 30, 2004 (WO 2004/100552, published Nov. 18, 2004), which is based on French Patent Application No. 03/50140, filed May 2, 2003.

FIELD OF THE INVENTION

This invention relates to the treatment and protection of animated, visual digital streams encoded according to a format using vector graphics.

BACKGROUND

It is possible to transmit audiovisual films and programs in digital form via broadcasting networks of the microwave, cable, satellite type, etc., or via telecommunication networks of the DSL (Digital Subscriber Line) or BLR (local radio loop) type or via DAB (Digital Audio Broadcasting), etc. To avoid pirating of works broadcast in this manner, they are frequently encrypted or scrambled with various well-known means.

As concerns the processing of audiovisual streams constituted of objects, U.S. Pat. No. 6,233,356 B1 discloses systems for encoding and decoding video objects of the MPEG-4 type divided into several layers: A base layer and at least one enhancement layer. The base layer contains sufficient information about the video object for decoding a base representation. The layers called "enhancement layers" contain information for enhancing the quality of the video stream by augmenting the resolution in the spatial and temporal areas. The method of encoding and decoding is capable of encoding and decoding a multilayer MPEG-4 stream. However, that method of encoding is not presented as being able to be used for protecting the original video stream nor for scrambling objects of the visual sequences.

U.S. 2001/0053222 A1 discloses a process and system for the protection of video streams encoded with the MPEG-4 norm. The audiovisual stream is composed of several audio and video objects with the scenic composition being described by the BIFS (Binary Format For Scene) format and also contains IPMP information ("Intellectual Property Management and Protection"). Of all the visual objects contained in the scene, only the video objects are protected. It does not disclose protection for the synthetic objects. Also, the description of scenes in the BIFS format is not secured. Protection is effected by a method of encryption with the aid of four keys. The video object encrypted is then multiplexed with the other video objects in a digital stream sent to the user. The first key, specific for each user, is encrypted with a second one, the result is encrypted with a third key and two pieces of unlocking information are generated from this combination that are sent to the user after identification and authorization. This resulting set is also encrypted with a fourth key and the latter set is multiplexed with the other objects in the audiovisual stream. The last key is periodically updated. Once the stream is protected in this manner, the first key and the two pieces of unlocking information are sent in advance to the address/addressee's equipment, that decrypts the protected stream. The video object is reconstituted with the aid of the fourth key regenerated on the addressed equipment from the two pieces of unlocking information, from the first key, sent in advance, and from the fourth key in addition to information contained in the IPMP part of the MPEG-4 stream sent to the user.

However, that system does not permit a resolution of the security problem because the protection of the video stream rests on an encryption system based on digital keys but for which the video stream transmitted to receiving equipment contains, even in encrypted form, all the information initially present in the original video stream. Thus, the video stream received by the client equipment already contains all the information initially present in the non-encrypted video stream, even if they are stored in a form that does not permit their immediate use.

The known protection techniques are frequently based on a system of protection by key(s) where the user is in possession of the entire visual stream at a given moment. Provided with sufficient calculating means, an ill-intentioned user is therefore capable of finding the protection keys and therefore reconstituting the digital stream for the simple reason that the entire visual information is present in the protected stream.

SUMMARY OF THE INVENTION

This invention relates to a process for secured distribution of vector visual sequences in at least two dimensions, animated and including a succession of frames containing at least one multidimensional geometric object to be displayed on a screen of a user and determined by at least one parameter including analyzing the stream prior to transmission to addressee equipment to generate a modified main stream by deletion and replacement of information coding the original visual signal, having a format the same as the format of the original stream, but of which at least one frame was modified, and complementary information of any format including digital information suitable for permitting reconstruction of the modified frames, which modified main stream and which complementary information are transmitted separately to the addressee equipment.

This invention also relates to a system for securing a synthetic video stream including at least one multimedia server containing original vector visual sequences, a device for analyzing the original video steam, a device for separating the original video stream into a modified main stream by deletion and replacement of information coding the original visual signal and complementary information as a function of the analysis, at least one distributor and at least one device in the addressee equipment for reconstruction of the visual stream as a function of the modified main stream and the complementary information.

BRIEF DESCRIPTION OF THE DRAWING

The invention will be better understood with the aid of the following purely explanatory description of a preferred and non-limiting embodiment of the invention with reference made to the FIGURE which is a schematic of a particular embodiment of a client-server system in accordance with aspects of the invention.

DETAILED DESCRIPTION

Aspects of this invention provide a reliable solution for protecting visual and graphic synthetic contents generated with the principle of the BIFS format.

Contrary to the majority of the "classic" protection systems, the principles described below allow a high level of protection to be ensured while reducing the volume of information necessary for the decoding.

The protection, realized in a manner in conformity with aspects of the invention, is based on the principle of the deletion/removal/suppression and replacement of information coding the original digital signal by any method such as: Substitution, modification, permutation or moving the information. This protection is also based on a recognition of the structure of the binary stream at the output of the digital encoder.

The invention concerns in a general manner any stream representing an animation using multidimensional objects from predefined shapes or from mathematical formulas that describe their shape as well as from their color and their position and/or from other parameters. Certain formats based on this type of description using the primitives of predefined shapes such as "box" (for a parallelepiped), "sphere" and primitives permitting the creation of arbitrary shapes.

Thus, the stream furnishes the information that permits filling of locations/sites/emplacements of the display space rather than effecting the filling of each point of this space (as is the case for a bitmap image, for example). This method of describing a scene can use objects in two or three dimensions.

Furthermore, aspects of the invention concern description of the scene containing the multidimensional objects and their animation. The binary stream contains information on the transformations carried out in time on these objects defined as above to realize their animation (translation, rotation, deformation and the like).

Aspects of the invention also concern the general principle of a process for securing an audiovisual stream. The objective is to authorize the services of synthetic video on demand and à la carte via all the broadcasting networks, and local recording in the digital decoder box of the user as well as direct viewing of channels broadcast in this manner. The process extracts and permanently preserves outside of the dwelling of the user, and in fact in the broadcasting and transmitting network, a part of the audiovisual program recorded at the client's or directly broadcasted, which part is of primary importance for correctly viewing the audiovisual program on a television screen or a monitor-type screen, but which has a very low volume relative to the total value of the digital audiovisual program recorded at the user's or received in real time. The lacking part is transmitted via the broadcasting (transmitting) network at the moment of the viewing of the audiovisual program.

The invention provides a process and security system permitting the visual scrambling and recomposing (descrambling) of the contents of a visual stream containing multidimensional, digital synthetic objects describing objects from their shape, position, color, size and/or from other parameters as is done, e.g., by the MGEG-R BIFS ("Binary Format for Scene").

The invention also relates to a device capable of transmitting in a secure manner a set of high-quality visual streams in two or three dimensions, animated and encoded according to a format using vector graphics to a television screen and/or for being recorded on the hard disk of a box connecting the telecommunication network to a viewing screen such as a television screen or a personal computer monitor while preserving the audiovisual quality, but avoiding fraudulent use such as the possibility of making pirated copies of the streams or audiovisual programs recorded on the hard disk or on any other recording support of the decoder box. The invention concerns a client-server system and the synchronization mechanism between this server that supplies the stream permitting the viewing of the secure visual sequence and this client who reads and displays the digital audiovisual stream.

In the following the description concerns streams in the MPEG-4 BIFS format without this constituting a limit to the scope of the invention. This applies in the same manner to any stream format permitting the description of an animated audiovisual scene using multidimensional digital objects for describing the different parts of the scene.

The protection process comprises three stages:
A preparatory stage comprising analyzing and modifying at least one part of the original video stream in the MPEG-4 BIFS format.
A transmission stage
Of a main stream modified in conformity with the format of the original visual, comprising fields modified in the course of the preparatory stage and
By a path, separate from this main stream, of complementary digital information permitting reconstitution of the original visual stream from a calculation on the addressed equipment as a function of the modified main stream and the complementary information.
A reconstitution stage on the addressee equipment of the original visual stream from the modified main stream and the complementary information.

As the digital stream is separated into two parts, the largest part, that is, the modified main stream, may therefore be transmitted via a classic broadband broadcasting network whereas the lacking part, that is, the complementary information, may be sent on demand via a narrow band telecommunication network such as classic telephone networks or cellular networks such as the GSM, GPRS or UMTS type or by using a small part of a network of the DSL or BLR type or even using a subset of the bandwidth shared on a cable network. The audiovisual stream is reconstituted on the addressed equipment (decoder) by a synthesis module from the modified main stream and the complementary information.

To better understand selected aspects of the invention, a protection system comprising an analysis-scrambling and descrambling module based on the principles of the digital format MPEG-4 BIFS will be described. The process and the concepts illustrated in this manner apply equally to every stream using multidimensional objects such as they are described above.

The analysis and scrambling module is based on the substitution by "decoys" or on the modification of elements belonging to the nodes, fields, routes or other components describing or forming part of the MPEG-4 BIFS scene. The fact of having removed and substituted a part of the data of the original visual stream during generation of the modified main stream does not permit restitution of this original stream from only the data of the modified main stream.

One aspect of the invention concerns, according to its most general meaning, a process for the secured distribution of synthetic visual sequences in at least two animated dimensions and comprising a succession of frames containing at least one multidimensional geometric object to be displayed on the screen of the user and determined by at least one parameter (color, scale, dimensions, coordinates of points of the object) for which an analysis of the stream is made prior to transmission to the client equipment to generate a modified main stream having a format the same as the format of the original stream, but of which certain frames have been modified, and complementary information of any format comprising digital information suitable for permitting reconstruction of the modified frames, which modified main stream and which complementary information generated in this manner are transmitted separately to the addressee equipment.

This analysis stage advantageously comprises modifying at least one parameter of at least one multidimensional object described in the stream.

At least one of the multidimensional objects may be an object defined in two dimensions. Moreover, it is possible that at least one of these multidimensional objects is an object defined in three dimensions.

The format used for coding the visual sequences is advantageously the MPEG-4 BIFS format although it may be in other formats. In this instance, at least one of the parameters of at least one of the "QuantizationParameter" nodes of the visual sequence is modified or substituted during the analysis and scrambling phase. Likewise, in the instance of MPEG-4 BIFS, one or more different fields of one or more nodes are modified:

The "Radius" fields of certain "Circle" nodes;
The "Size" fields of certain "Rectangle" nodes;
The "Coord" fields of certain "Curve" nodes;
The "Coord" fields of certain "IndexedFaceSet2D" nodes;
The "Coord" fields of certain "IndexedLineSet2D" nodes;
The "Radius" fields of certain geometric "Sphere" nodes;
The "Size" fields of certain geometric "Box" nodes;
The "bottomRadius" and/or "height" fields of certain geometric "Cone" nodes;
The "Radius" and/or "height" fields of certain geometric "Cylinder" nodes;
The "Coord" and/or "SFNormalNode" fields of certain geometric "IndexedFaceSet" nodes;
The "Coord" fields of certain geometric "IndexedLineSet" nodes.

Finally, at least one Intra frame managed by the BIFS-Anim protocol may be modified.

According to another aspect, a synthesis of a stream in the original format is calculated on the addressed equipment as a function of the modified main stream and of the complementary information.

The modifications applied to the main stream are advantageously perfectly reversible (lossless process) and the digital stream reconstituted from the modified main stream and the complementary information is the same as the original stream.

The transmission of the modified main stream may be realized via a physically distributed support material (CD-ROM, DVD, hard disk, flash memory card or the like).

The complementary information may be realized via a physically distributed support material (flash memory card, smart card or the like). The support material (flash memory card, smart card or the like) advantageously contains the applications and the algorithms to be used for the synthesis phase.

The invention also includes a system for securing a synthetic video stream which comprises at least one multimedia server containing the original synthetic video sequences, a device for analyzing the original video stream, a device for separating the original video stream into a modified main stream and into complementary information as a function of the analysis, at least one telecommunication network and at least one device in the addressee equipment for reconstruction of the visual stream as a function of the modified main stream and the complementary information.

Selected aspects of the invention will be better understood from a reading of the description of a following preferred, but non-limiting embodiment that makes reference to the FIGURE describing a total architecture of a selected system for implementing one aspect of the process of the invention. The described protection of visual streams is worked out based on the structure of the binary streams and their characteristics due to the MPEG-4 BIFS encoding. This structure will be recalled in the following.

The digital visual sequences of the MPEG-4 BIFS type are constituted of at least one "Transform" node containing or not containing a node with quantification parameters ("Quantizationparameter") and by at least one "shape" node containing a field defining the geometry of this shape ("geometry"), which field comprises a node specific for the type of geometric shape to be displayed such as, e.g., box for a parallelepiped, sphere, rectangle (for tracing a rectangle), circle for tracing a circle, "IndexedFaceSet2D" (for tracing a polygonal surface defined by the coordinates of the summits of the polygon), and used by all the decoders capable of displaying it in order to be able to decode the sequence correctly.

As is well-known, the base structure of the MPEG-4 BIFS format directly inherits VRML (Virtual Reality Modeling Language). The VRML norm contains a certain number of nodes for representing the objects of which the visual scene is composed and it constructs the graph of the scene and describes its behavior and the interactivity. However, VRML does not support two-dimensional graphics and is not intended for transmission in direct broadcasting mode ("streaming" or "broadcasting"). The additions of MPEG-4 BIFS relative to VRML are the support of 2D [2-D] graphics, the advanced audio functionalities, the protocol for updating the scene to modify it in time, the protocol for animating the scene to animate the objects constituting it in time, the temporal model, the binary encoding as well as the specific supports (for the synthetic visual objects, facial and body animation, mesh). Compression in the binary stream permits a remarkable gain of space between a VRML file and its equivalent encoded in MPEG-4 (a compression rate of at least 15 times is achieved). Likewise, the scene graph uses the structure defined in VRML as well as the "DEF" and "USE" mechanisms for defining and reusing a node.

The two-dimensional "2D" scene graphs are a particular case of a scene in three dimensions "3D" [3-D], specially added in MPEG-4 BIFS to permit the rendering of 2D scenes, representations widely used in the MPEG world, as the 3D scenes are not at all efficient for representing 2D. The representation of 2D animations is based especially on the translations, rotations, the change of scale and the order of the depth of the object relative to each other. The representation in two dimensions requires new nodes such as "Transform2D" and new specific objects such as, e.g., "Circle" or "Rectangle", not defined by the standard objects in three dimensions.

The interactivity and the behavior in VRML are managed with the aid of sensors that that generates events as a function of an action of the user or of the scene with the aid of interpolators that are capable of generating attributes varying in time and dedicated to the animation, and ROUTEs [sic] used to transmit events from one node to another one. For MPEG-4 BIFS, the interpolators of VRML are inherited, the routes are used that connect the values of one node field to a corresponding field of another node, and the sensors are used for capturing the actions of the user.

The mechanisms for updating a scene are based on the functioning in direct broadcasting mode ("streamed") of a MPEG-4 BIFS stream, that is to say, that at the start of the reading an initial scene is put in place, but in the course of time it can be updated by a certain number of commands defined by the protocol BIFS-Command: Insert, Delete and Replace a node, an indexed field or a route, or update the scene entirely (upgrade) to totally replace the current scene with a new one.

As for the animations, they are managed by the BIFS-Anim protocol, that is designed to allow a large compression of data while authorizing the animation during the reading. To animate certain objects with this protocol, they are defined in the original scene (by DEF) and the animation masks containing the list of nodes and fields to be animated are defined in the configuration descriptor for the decoder ("BIFSConfig") contained in the elementary stream. Only the fields containing the digital values can be animated (such as, e.g., the fields SF/MFInt32, SF/MFFloat, SF/MFColor). The successive modifications relative to the animation are then contained in the animation frames forming the temporal access units ("access unit"). At this level, two modes exist, "Intra" and Predictive. In Intra mode, the field values are obligatorily quantified. In predictive mode, only the differences between the current quantified value and the last value transmitted is coded with the aid of an adaptive arithmetic coder.

Quantification is used to improve compression of the binary stream. It is used especially when the scene has numerous coordinates where each surface is designed with the aid of polygons with more or less numerous summits, and is obligatory in the case of Intra frames in BISF-Anim. A particular node, the "QuantizationParameter" (QP) is defined and when it is used, it allows application of a quantification either to all the nodes and their descendents that follow it or solely to the first node that follows it and to its descendents. The quantification applied is generally linear between a minimum value and a maximum value (values contained in the QP). The QP also defines the number of bits used to quantify all the values possible between the minimum and the maximum values. Thus, in the case of a two-dimensional cartoon fabricated solely with the aid of polygons, using the QP's allows the obtention of a supplementary compression with a factor of three.

The MPEG-4 BIFS scenic description is a collection of nodes that describe the scenic structure. The notes are grouped in types of data nodes ("Node Data Types" or "NDT's"). From a notational point of view "SF" is always used to declare the fields with a single value ("Single Valued Fields"). In the new writing, variable/value is noted. The nodes are composed of primary components called "fields," that then represent the attributes and the interfaces of the nodes.

A field has the following characteristics:
A value
A type for this value
The behavior type that designates whether the field is constant ("field"), modifiable ("exposedField"), whether it is solely a source of events ("eventOut") or solely a receptacle of events ("eventIn").
These fields can be quantified to increase compression.

Only one node of a subset of nodes is valid at a particular moment in the graph and, as a consequence, in the binary stream. A unique node identifier ("NodeID") used for referencing corresponds to each node.

Certain fields are active and emit events ("eventOut"). The latter are then transmitted by the routes. They are composed of a source field and a target field each one of which is identified by the identifier ("DEF_ID") of the node to which it belongs. The routes connect two fields of the same type. Thus, if a value changes, it will then be changed immediately in the target field by the route mechanism.

Each entity that is visible in a scene is attached to a shape node. A shape node contains two fields, geometry and appearance. The appearance field itself contains an appearance node that contains the information for color, filling and transparency as well as other attributes concerning the aspect or nodes specific for the texture. The geometry field contains the information concerning the shape of the visual element to be displayed such as, e.g., "Box", "Sphere", "Rectangle", "Circle", "Curve2D", "IndexedLineSet", "PointSet2D", "IndexedFaceSet", "Cone", and "Cylinder."

In the general case of 3D, "IndexedFaceSet" serves to display a three-dimensional surface described by its summits. The latter are given in the "Coord" field that it contains. This field is filled with successive coordinates (that is, triplets of values for localizing each point of the surface in a 3D mark/indicator). Moreover, the surface contains a Normal field ("SFNormalNode") that contains a list of three-dimensional vectors used especially during the calculation of the rendering of the lighting on such a surface.

In the particular case of 2D, to which this particular embodiment applies with preference, "IndexedFaceSet2D" serves to display a polygonal plane surface described by its summits. The latter are given in the "Coord" field that it contains. This field is filled with successive coordinates (in 2-D, abscissa values, then ordinate values, successively). Likewise, "IndexedLine2D" functions in the same manner, but only traces the line defined by the succession of the given coordinates without closing the polygonal surface.

Example of textual description:

```
Transform2D
{
    scale 0.5 0.5
    children [
        QuantizationParameter
        {
            position2DQuant true
            position2DMin -20.0 -20.0
            position2DMax 20.0 20.0
            position2DNbBits 12
            colorQuant false
            useEfficient Coding true
        }
        Shape
        {
            appearance Appearance
            {
                material Material2D
                {
                    emissiveColor 0.8 0.566 0.2
                    filled TRUE
                    transparency 0
                }
                geometry IndexedFaceSet2D
                {
                    coord Coordinate2D
                    {
                        point [ 10 -10 10 10
                        -10 10 -10 -10 ]
                    }
                }
            }
        ]
}
```

This example of a 2D surface created with the MPEG-4 BIFS format can be reproduced with a format using vector graphics that is, the surface is defined by its color, position and occupation of space (from a predefined shape or from mathematical formulas giving its limits).

Furthermore, a complete MPEG-4 BIFS scene contains numerous objects created in this manner, each composed of a multitude of points (the more points, the greater the precision and the quality of the contours of the objects) for defining each summit of the polygons. Moreover, an MPEG-4 BIFS scene can simultaneously contain 3D objects and 2D surfaces defined in this manner.

It can be seen from this simple example that the original scene is disturbed by changing several parameter values directly in the binary stream. To scramble the scene, the values of the color, filling of the surface, the scale for reducing or enlarging the rendering of the multidimensional object are changed and, finally, one or several field values coordinated for deforming the object further are transformed.

The resulting modified main stream is totally compatible with the standard with which the original stream was generated, but does not comprise the same visual information. To obtain a minimal size of the complementary information, a limited number of multidimensional objects are modified in the total number of the objects describing the animations developed that contain a considerable number of points.

The content creator advantageously uses the techniques recommended by the norm or standard to increase compression, that is, the use of the "QuantizationParameter" node in such a manner as to quantify the coordinates in particular. In this instance, transforming the fields of the QP (e.g., changing the minimal values "position2DMin" values) has the effect of changing in a global manner the representation of the object or objects concerned by this QP. In fact, changing the bounds of the quantifier amounts to modifying the representation since the coordinates of the points are encoded relative to these bounds. A change of scale of the objects touched by this transformation is therefore obtained.

To increase degradation, certain coordinates are also modified in a random manner, e.g., to ensure that the original shape is deformed. This modification is carried out for at least one object composing the scene.

The elements already described are advantageously found in the stream and certain digital values are substituted by others while ensuring the conformity of the modified main stream in the format of the original stream.

Another exemplary embodiment is modification of the radius field of a geometric circle node to modify its size. The size field is modified for the geometric nodes of the rectangle types and its original size is thus replaced with a calculated or random "decoy" size. Furthermore, the coordinates field ("SFCoordinate2DNode") of a Curve geometric node ("Curve2D") is modified to modify its representation.

As concerns the 3D objects, modification of the radius field of a Sphere geometric node modifies its size. For the geometric nodes of the parallelepiped ("box") types, the size field is modified and its original size (triplet of 3 values) is thus replaced with a calculated or random "decoy" size.

The geometric shape representing a cone is transformed by modifying the values of the radius ("bottomRadius") and of the cone height by calculated or random "decoy" values.

The geometric form representing a cylinder is transformed by modifying the values of the radius and cylinder height by calculated or random "decoy" values.

Modification of the coordinates field of a geometric polygon ("IndexedFaceSet" or "IndexedFaceSet2D" node) (for its representation in 2D) is also carried out in order to deform its representation. In the case of 3D, the normal field ("SFNormalNode") is also modified to modify the results of the evaluation of the lighting equation of the object or of any other result requiring the use of the normal vector.

The modification advantageously concerns the coordinates field of a Broken Line geometric node ("IndexedLineSet" or "IndexedLineSet2D") (for its representation in 2D) in order to change its representation.

The scale and/or translation and/or rotation fields of a transform node or "IndexedLineSet2D" in 2D are also substituted by calculated or random "decoy" values to modify the visual rendering during the display.

Turning now to the Drawing, the original stream 1 stems directly in digital form from an MPEG-4 BIFS encoder.

Encoded original visual stream 1 to be secured is passed via connection 2 to analyzing and scrambling module 31 that generates modified main stream 32 in a format the same as the format of entering stream 1 aside from the fact that certain elements describing the scene were replaced by values different than the original ones, and is stored on server 3. Complementary information 33 of any format contains information relative to the elements of the sequences that were modified, replaced, substituted or moved, and their value or location in the original stream. Complementary information 33 is also stored in server 3.

The analysis stage of realized by module 31 may be followed by a scrambling stage, that comprises transforming each "Polygon" node by changing a couple of coordinates out of 10 by a couple of random values. The original values are stored in complementary information 33.

The analysis realized by module 31 may detect the presence of "QuantizationParameter" nodes that define minimum and maximum bounds to be used for applying a quantification to sets of the coordinates of the polygons defined. For certain "QuantizationParameter" nodes, module 31 modifies the values of the minimum and maximum bounds (that is, for entire values for a 2D object with the original values being stored in the complementary information) and replaces them with "decoy" values that are adapted and coherent, but remote from the original values. This yields a distortion effect of the shapes of the defined polygonal surfaces.

The process is advantageously applied to an encoded stream using the BIFS-Anim protocol. In this type of stream, the Intra frames are necessarily quantified. Module 31 exercises the modifications in the fields of the QP's used in these Intra frames. Furthermore, to ensure a greater protection, module 31 changes a certain number of surfaces in the Intra frames. In fact, the Predicted frames are based on the surfaces defined in the Intra frames. Modifications of the Intra frames therefore entrain a temporal prolongation of the degradation by virtue of the fact of this connection.

The stream resulting from transformation 32 is in a format the same as original stream 1.

Modified main stream 32 is then transmitted via high-speed network 5 of the microwave, cable, satellite, etc. type to the terminal of user 8 and is stored in memory 81 that can be, e.g., a hard disk. When user 8 makes the request to view the animated sequence present in memory 81, two outcomes are possible: In a first instance, user 8 does not have all the rights necessary to see the animated sequence and animation stream 32 generated by scrambling module 31 present in memory 81 is passed to synthesis system 86 via reading buffer memory 83 that does not modify it and transmits it identically to a reader capable of decoding it 87, and its content, degraded visually by scrambling module 31 is displayed on viewing screen 9.

In a second instance, server 3 decides that user 8 has the rights to see the animated sequence. In this instance, synthesis module 86 makes a viewing request to server 3 containing complementary information 33 necessary for recovering original sequence 1. Server 3 then sends complementary information 33 via telecommunication networks of the analog or digital telephone line type, such as DSL (Digital Subscriber Line) or BLR (local radio loop) type, via DAB (Digital Audio Broadcasting) networks or via mobile digital telecommunication networks (GSM, GPRS, UTMS) 7, permitting reconstitution of the original sequence in such a manner that user 8 can store it in buffer memory 85. Network 7 can advantageously be of the same type as network 5.

Network 7 can advantageously be combined with network 5.

Synthesis module 86 then proceeds to restore the original visual stream from the modified mainstream that it reads in its reading buffer memory 83 and from the complementary information read in buffer memory 85 that permits it to recognize the original positions and values of the modified fields. The sequence reconstituted in the MPEG-4 BIFS format is sent to reader-decoder 87 for this format. The original reconstituted visual sequence is then displayed on viewing screen 9 of user 8.

Modified main stream 32 is advantageously passed directly via network 5 to reading buffer memory 83, then to synthesis module 86.

Modified main stream 32 is advantageously inscribed (recorded) on a physical support such as a disk of the CD-ROM, DVD type, hard disk, flash memory card 4 or the like. Modified main stream 32 is then read from physical support 4 by disk reader 82 of box 8 to be transmitted to reading buffer memory 83, then to synthesis module 86.

Complementary information 33 is advantageously recorded on a physical support 6 with a credit card format constituted of a smart card, a flash memory card or the like. Card 6 is read by card reader 84 of the device of user 8.

Card 6 advantageously contains the applications and algorithms that will be executed by synthesis system 86.

Device 8 is advantageously an autonomous, portable and mobile system.

The above description is not limited only to 2D or 3D objects defined by the MPEG-4 BIFS norm and is extended to any format of graphic and vector description using objects constructed from their shape, position, color, dimension and/or other parameters describing them.

Moreover, the concept described applies to any node defined in the same manner as the examples of nodes given above and containing at least one field for defining the structure of the object described by the node. This type of field has a functionality similar to those defined by the "Coord" or "Color" or "Translation" or "Rotation" or "Scale" fields of the MPEG-4 BIFS norm.

Device 3 advantageously transforms any stream representing a vector animation using the same principles as those put in place by MPEG-4 BIFS.

Device 3 advantageously modifies any stream representing an animation in 3 dimensions. The principles of the functioning of the protection are the same as for the above example, but the modifications are performed on nodes specific for the shapes in three dimensions (cubes, cones, etc.). As concerns the coordinates, they are not couples of coordinates, but rather triplets of coordinates that are modified.

The examples cited illustrate selected principles of modifications on a binary stream to protect it and are applicable to any stream having similar characteristics.

The invention claimed is:

1. A process for distribution of a stream having a format, the stream including multi-dimensional, animated vector visual sequences, the sequences including a succession of frames representing at least one multidimensional geometric object to be displayed on addressee equipment, the at least one multidimensional geometric object comprising at least one predefined shape that includes at least one parameter or being at least partially defined by a mathematical formula that includes at least one parameter, the process comprising:

modifying the stream by substituting information in at least one of the frames, to provide at least one modified frame that is included in a modified stream, the modified stream having a format the same as the format of the stream, wherein said substituting comprises substituting at least one value for at least one parameter of at least one predefined shape or mathematical formula in at least one of the frames;

generating complementary information of any format, wherein the complementary information includes digital information relative to original elements of the modified stream that were substituted, the complementary information being suitable for reconstructing the stream from the modified stream;

transmitting the modified stream and the complementary information separately to the addressee equipment, to enable reconstruction of the stream on the addressee equipment as a function of the modified stream and the complementary information.

2. The process according to claim 1, wherein the at least one parameter of the at least one predefined shape or mathematical formula determines, at least in part, a shape, color, or position relating to the multidimensional geometric object.

3. The process according to claim 1, wherein the multidimensional geometric object is defined in two dimensions.

4. The process according to claim 1, wherein the multidimensional geometric object is defined in three dimensions.

5. The process according to claim 1, further comprising coding the visual sequences in a MPEG-4 BIFS format.

6. The process according to claim 5, wherein the at least one parameter of the at least one predefined shape or mathematical formula determines, at least in part, a shape, color, or position relating to the multidimensional geometric object.

7. The process according to claim 5, wherein modifying the stream includes applying reversible modifications to the stream.

8. The process according to claim 1, wherein transmitting the modified stream includes transmitting the modified stream via a broadcasting network.

9. The process according to claim 1, wherein transmitting the complementary information includes transmitting the complementary information via a narrow band network.

10. The process according to claim 9, wherein transmitting the complementary information includes transmitting the complementary information via a portable memory component.

11. A system for transmitting a video stream, the system comprising:

at least one multimedia server including a device to analyze an original video stream to generate a modified stream, by substituting information in at least one frame of the original video stream to provide at least one modified frame, the frame representing at least one multidimensional geometric object to be displayed on addressee equipment, wherein the at least one multidimensional geometric object comprises at least one predefined shape having at least one parameter or is at least partially defined by a mathematical formula including at least one parameter, and wherein said substituting comprises substituting at least one value for at least one parameter of at least one predefined shape or mathematical formula, and to generate complementary information including digital information relative to original elements of the modified stream that were substituted, the complementary information being for reconstruction of the original video stream from the modified stream; and at least one distributor to transmit the modified stream and the complementary information to at least one device in the addressee equipment to enable reconstruction of the original video stream as a function of the modified stream and the complementary information.

12. The process according to claim 5, wherein the at least one parameter includes at least one of a radius field of a circle node, a sphere node or a cylinder node, a size field of a rectangle node or a box node, a "coord" field of a curve node, an "IndexedFaceSet2D" node, an "IndexedLineSet2D" node, an "IndexedFaceSet" node, or an "IndexedLineSet" node, or a "bottomRadius" field or a height field of a cone node.

13. The process according to claim 5, further comprising modifying at least one intra frame that is managed by an animation protocol.

14. A server comprising original video sequences to be transmitted to a recipient device, the server being configured to:
generate a modified stream by substituting information in at least one frame of a video stream to provide modified frames, the frames representing at least one multidimensional geometric object to be displayed on addressee, wherein the at least one multidimensional geometric object comprises at least one predefined shape having at least one parameter or is at least partially defined by a mathematical formula including at least one parameter, and wherein said substituting comprises substituting at least one value for at least one parameter of at least one predefined shape or mathematical formula,
generate complementary information including digital information relative to original elements of the modified stream that were substituted, the complementary information being for reconstruction of the video stream from the modified stream; and
transmit the modified stream and the complementary information to at least one device in the addressee equipment to enable reconstruction of the video stream as a function of the modified stream and the complementary information.

15. The server according to claim 14, further comprising a buffer to store the video stream, a buffer to store the modified frames and a buffer to store the complementary information.

16. A device for reconstitution of original video sequences transmitted by a server, the device configured to:
receive a modify stream including at least one modified frame of a video stream that was modified by substituting information in at least one frame of an original video stream, the frame representing at least one multidimensional geometric object to be displayed on the device, wherein the at least one multidimensional geometric object comprises at least one predefined shape having at least one parameter or is at least partially defined by a mathematical formula including at least one parameter, and wherein said substituting comprises substituting at least one value for at least one parameter of at least one predefined shape or mathematical formula;
receive complementary information that includes relative to original elements of the modified stream that were substituted, the complementary information being for reconstituting of the original visual stream from the modified stream;

reconstitute the original video stream as a function of the modified stream and the complementary information, including recognizing original positions and values of modified fields; and display a reconstituted original video stream.

17. The device according to claim 16, further configured to display the modified stream, if a user does not have rights to view the reconstituted original video stream.

18. A server for transmitting a video stream, the server comprising:
a module configured to generate a modified video stream by substituting at least one modified value for a least one value included in at least one frame of the video stream, to provide one or more modified frames, wherein at least one of said frames includes at least one multidimensional geometric object of the video stream, the multidimensional geometric object comprising at least one predefined shape having at least one parameter or being at least partially defined by a mathematical formula including at least one parameter, and wherein the video stream is modified by substituting a value for at least one parameter of at least one multidimensional geometric object, wherein said substituting comprises substituting at least one value for at least one parameter of at least one predefined shape or mathematical formula, and wherein the module is further configured to generate complementary information including digital information for permitting reconstruction of the video stream from the modified video stream; and
one or modules configured to transmit the modified video stream and the complementary information separately to at least one device of an addressee.

19. A user device for receiving and enabling playback of received video information, the device comprising:
at least one module configured to receive a modified video stream having at least one modified frame that was modified by substituting at least one modified value for at least one value of at least one frame of an original video steam, wherein at least one of said frames includes at least one multidimensional geometric object of the video stream, the multidimensional geometric object comprising at least one predefined shape having at least one parameter or being at least partially defined by a mathematical formula including at least one parameter, and wherein the video stream was modified by substituting a value for at least one parameter of at least one multidimensional geometric object, wherein said substituting comprised substituting at least one value for at least one parameter of at least one predefined shape or mathematical formula;
at least one module configured to receive complementary information that includes digital information for permitting reconstitution of the original video stream from the modified video stream;
a synthesis module configured to reconstituting the original video stream as a function of the modified video stream and the complementary information; and
a display to display video based on the reconstituted original video stream.

* * * * *

UNITED STATES PATENT AND TRADEMARK OFFICE
CERTIFICATE OF CORRECTION

PATENT NO. : 7,957,530 B2  Page 1 of 1
APPLICATION NO. : 11/264306
DATED : June 7, 2011
INVENTOR(S) : Lecomte et al.

It is certified that error appears in the above-identified patent and that said Letters Patent is hereby corrected as shown below:

Column 11, line 60, in Claim 1, delete "multi-dimensional," and insert -- multidimensional, --.

Column 14, line 31, in Claim 18, delete "one or modules" and insert -- one or more modules are --.

Column 14, line 40, in Claim 19, delete "video steam," and insert -- video stream, --.

Signed and Sealed this
Tenth Day of July, 2012

David J. Kappos
*Director of the United States Patent and Trademark Office*